(12) United States Patent
O'Hora et al.

(10) Patent No.: US 12,168,757 B2
(45) Date of Patent: Dec. 17, 2024

(54) WELL DEFINED LOW MOLECULAR WEIGHT DISPERSANT POLYMETHACRYLATES

(71) Applicants: The Lubrizol Corporation, Wickliffe, OH (US); University of Warwick, Coventry (GB)

(72) Inventors: Paul O'Hora, Nottingham (GB); Dixit Parmar, Long Eaton (GB); Timothy R. Smith, Belper (GB); David M. Haddleton, Coventry (GB); Georgios Patias, Coventry (GB)

(73) Assignees: The Lubrizol Corporation, Wickliffe, OH (US); University of Warwick, Coventry (GB)

( * ) Notice: Subject to any disclaimer, the term of this patent is extended or adjusted under 35 U.S.C. 154(b) by 0 days.

(21) Appl. No.: 17/924,247

(22) PCT Filed: May 7, 2021

(86) PCT No.: PCT/US2021/031346
§ 371 (c)(1),
(2) Date: Nov. 9, 2022

(87) PCT Pub. No.: WO2021/231220
PCT Pub. Date: Nov. 18, 2021

(65) Prior Publication Data
US 2023/0183595 A1 Jun. 15, 2023

Related U.S. Application Data

(60) Provisional application No. 63/023,935, filed on May 13, 2020.

(51) Int. Cl.
| | | |
|---|---|---|
| *C10M 149/00* | (2006.01) | |
| *C08F 8/32* | (2006.01) | |
| *C10N 20/04* | (2006.01) | |
| *C10N 30/04* | (2006.01) | |
| *C10N 40/25* | (2006.01) | |
| *C10N 70/00* | (2006.01) | |

(52) U.S. Cl.
CPC .............. *C10M 149/00* (2013.01); *C08F 8/32* (2013.01); *C10M 2217/003* (2013.01); *C10N 2020/04* (2013.01); *C10N 2030/04* (2013.01); *C10N 2040/25* (2013.01); *C10N 2070/00* (2013.01)

(58) Field of Classification Search
CPC .......... C10M 149/00; C10M 2217/003; C10M 2217/06; C08F 8/32; C08F 220/18; C10N 2020/04; C10N 2030/04; C10N 2040/25; C10N 2070/00; C10N 2030/10; C10N 2030/54
See application file for complete search history.

(56) References Cited

U.S. PATENT DOCUMENTS 5,955,405 A * 9/1999 Liesen ............. C08F 220/1812
252/79

FOREIGN PATENT DOCUMENTS

| | | | | |
|---|---|---|---|---|
| CN | 1687153 A | * | 10/2005 | |
| EP | 1170304 A1 | | 1/2002 | |
| EP | 1203779 A1 | * | 5/2002 | .......... C10M 145/14 |

OTHER PUBLICATIONS

Wang Yongqiang, et al., "Graft polymers prepared by catalytic chain transfer polymerization (CCTP) and applied as solvent-borne dispersants for carbon black dispersions of high solid", e-Polymers, Dec. 1, 2010, pp. 1255-1263, Retrieved from the Internet.

* cited by examiner

*Primary Examiner* — Latosha Hines
(74) *Attorney, Agent, or Firm* — Christopher P. Demas; Michael A. Miller

(57) ABSTRACT

The present invention provides, among other things, a process to produce a low molecular weight dispersant polymethacrylate polymer ("LMWDPMA"), and the LMWDPMA itself, along with the use of the LMWDPMA in a lubricating composition, as well as a method for lubricating an internal combustion engine as disclosed herein.

7 Claims, No Drawings

WELL DEFINED LOW MOLECULAR WEIGHT DISPERSANT POLYMETHACRYLATES

CROSS REFERENCE TO RELATED APPLICATION

This application claims priority from PCT Application Ser. No. US2021/031346 filed on May 7, 2021, which claims the benefit of U.S. Provisional Application No. 63/023,935 filed on May 13, 2020, the entirety of which is hereby incorporated by reference.

BACKGROUND OF THE INVENTION

The present invention provides, among other things, a process to produce a low molecular weight dispersant polymethacrylate polymer ("LMWDPMA"), and the LMWDPMA itself, along with the use of the LMWDPMA in a lubricating composition, as well as a method for lubricating an internal combustion engine.

Low viscosity fluids are desirable to improve fuel economy/efficiency. One of the ingredients that most impacts the viscosity of a formulated fluid is the dispersant—typically because this is present at the highest treat rate in the fluid and because it is a "large" molecule (dispersants and detergent are considered "large molecules", antiwear, antioxidants, friction modifiers are typically considered small molecules).

One way to impact the viscosity of the fluid is to make the dispersant less viscous. However, many of the conventional ways in which one would lower the contribution of the dispersant to the final fluid viscosity, negatively impact cleanliness. This invention allowed for synthesis of a lower viscosity dispersant without negatively impacting the cleanliness of the fluid.

Typically the hydrophobic portion of a dispersant is made from a polymer or copolymer of low molecular weight olefins i.e., ethylene, propylene, isobutylene. Common ways to functionalize these hydrocarbon backbones include radical grafting, chlorine promoted, or thermal "ene" reactions to functionalize the hydrocarbon with an acylating agent. Control of the functionalization reaction is challenging with these types of reactions. In many cases, mixtures are formed where some molecules have one, two, or more acylating agents, while others are left unfunctionalized. The resulting acylating agent is then functionalized with amines. Unreacted olefin simply functions as a diluent, resulting in lower than desired yields of dispersant in the final composition.

Methacrylate polymers are commonly prepared by conventional free radical polymerization (FRP). This involves contacting monomers with a species capable of generating free radicals (the Initiator) and a chain transfer agent (CTA) which is typically a thiol species such as decanethiol. The CTA terminates propagating polymer chains by allowing the terminal polymer radical to abstract a hydrogen radical from the CTAs weak S—H bond. Therefore, polymer molecular weight can be controlled by the amount of CTA provided to the polymerization reaction. A drawback of this method is the relatively large quantity of sulfur containing CTA required to generate short, low molecular weight, polymer chains. Residual sulfur in the product thus formed is undesirable, and although sulfur removal is possible it is economically unattractive.

It would be advantageous to prepare a low molecular weight methacrylate polymer in a more viable route. It would also be advantageous to prepare a methacrylate polymer that could be terminated with a nitrogen-containing compound to prepare a dispersant like molecule (i.e., a molecule with a polar head and relatively non-polar tail) that is low in viscosity and also does not negatively impact cleanliness of the formulation.

SUMMARY OF THE INVENTION

Catalytic chain transfer polymerization (CCTP) allows preparation of very low molecular weight polymers without the problems associated with using sulfur containing CTAs. The CCTP catalyst is substantially free of sulfur, used in only small amounts, and is far more efficient in chain transfer.

Using catalytic chain transfer polymerization, we were able to synthesize a hydrophobic backbone which is uniquely positioned to react only once at the hydrophilic head of the molecule. In theory, the end functionalization can be accomplished in such a way so that no unreacted hydrocarbon backbone is present and every polymer chain reacts with an amine polar head group.

The disclosed technology, therefore, solves the problem of preparing low molecular weight polymethacrylates by preparing the polymer with catalytic chain transfer agents.

The disclosed technology also solves the problem of obtaining low molecular weight dispersant polymethacrylates by reacting low molecular weight polymethacrylates prepared with catalytic chain transfer agents with nitrogen-containing compounds.

One aspect of the technology is directed to a low molecular weight dispersant polymethacrylate polymer ("LMWDPMA") that encompasses the reaction product of a vinyl terminated polymethacrylate polymer having a number average molecular weight of about 1000 to about 5000 and a nitrogen-containing group.

The LMWDPMA can be employed in a lubricant composition with an oil of lubricating viscosity and other optional performance additives.

The technology also provides a method of lubricating an internal combustion engine by supplying to the internal combustion engine a lubricating composition containing the LMWDPMA.

Further, the technology includes a process for preparing a LMWDPMA by first, preparing a vinyl terminated polymethacrylate polymer by catalytic chain transfer polymerization; then reacting the vinyl terminated polymethacrylate polymer with a nitrogen-containing group in the presence of microwave radiation.

DETAILED DESCRIPTION OF THE INVENTION

The present invention provides, among other things, a process to produce a low molecular weight dispersant polymethacrylate polymer ("LMWDPMA"), and the LMWDPMA itself, along with the use of the LMWDPMA in a lubricating composition, as well as a method for lubricating an internal combustion engine as disclosed herein.

Low Molecular Weight Dispersant Polymethacrylate Polymers

The technology provides an LMWDPMA composed of a polymethacrylate back bone and terminated by a nitrogen-containing group.

The term "low molecular weight," is used with respect to the LMWDPMA to refer to a number average molecular weight ("Mn") of from about 500 to about 10,000, or from about 750 to about 7,500, or even from about 1000 to about 5000, or 1500 to 4000, or 1750 to 3000, as measured by gel permeation chromatography ("GPC"). All chromatography measurements were conducted using an Agilent 390-LC MDS instrument equipped with a differential refractive index and dual wavelength UV detectors. Poly(methyl) methacrylate and polystyrene standards were used for calibration.

In one embodiment, the LMWDPMA can be prepared as the reaction product of a vinyl terminated polymethacrylate polymer and a nitrogen-containing group.

The vinyl terminated polymethacrylate polymer can be synthesized by catalytic chain transfer polymerization ("CCTP"), in which the desired methacrylate monomers are reacted with a catalytic amount of a chain transfer agent. The catalyst interacts with a terminal radical on a propagating polymer chain to form a Co(III)—H complex and a macromonomer with useful terminal olefin functionality such as that shown in formula I below:

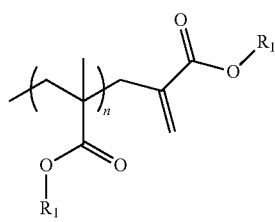

Formula I where $R_1$ is an alkyl group of 1 to 24 carbon atoms; and n is an integer of 3 to 30.

Desired monomers for preparation of the vinyl terminated polymethacrylate polymer can include, for example, a methacrylate monomer mixture comprising methacrylate monomers having alkyl groups of varying length. The methacrylate monomers may contain alkyl groups that are straight chain or branched chain groups or aromatic groups. The alkyl groups may contain 1 to 24 carbon atoms, for example 1 to 20 carbon atoms.

The vinyl terminated polymethacrylate polymer described herein can be formed from monomers derived from saturated alcohols, such as methyl methacrylate, ethyl methacrylate, propyl methacrylate, butyl methacrylate, 2-methylpentyl methacrylate, 2-propylheptyl methacrylate, 2-butyloctyl methacrylate, 2-ethylhexyl methacrylate, octyl methacrylate, nonyl methacrylate, isooctyl methacrylate, isononyl methacrylate, 2-tert-butylheptyl methacrylate, 3-isopropylheptyl methacrylate, decyl methacrylate, undecyl methacrylate, 5-methylundecyl methacrylate, dodecyl methacrylate, 2-methyldodecyl methacrylate, tridecyl methacrylate, 5-methyltridecyl methacrylate, tetradecyl methacrylate, pentadecyl methacrylate, hexadecyl methacrylate, 2-methylhexadecyl methacrylate, heptadecyl methacrylate, 5-isopropylheptadecyl methacrylate, 4-tert-butyloctadecyl methacrylate, 5-ethyloctadecyl methacrylate, 3-isopropyl octadecyl-methacrylate, octadecyl methacrylate, nonadecyl methacrylate, eicosyl methacrylate, methacrylates derived from unsaturated alcohols, such as oleyl methacrylate; and cycloalkyl methacrylates, such as 3-vinyl-2-butylcyclohexyl methacrylate or bornyl methacrylate.

Other examples of monomers for preparing the vinyl terminated polymethacrylate polymer can include alkyl methacrylates with long-chain alcohol-derived groups which may be obtained, for example, by reaction of a methacrylic acid (by direct esterification) or methyl methacrylate (by transesterification) with long-chain fatty alcohols. These fatty alcohols include Nafol® 1620, Alfol® 10, Alfol® 810, Alfol® 12, Alfol® 1012EE, Alfol® 1014CDC, Alfol® 1214, Alfol® 1214GC, Alfol® 1214HA, Alfol® 1216, and Lial® 125 of Sasol; Neodol® 91, Neodol® 23, Neodol® 25, Neodol® 45 and Neodol® 135 of Shell AG; C13-C15 Alcohol, Isotridecanol, Hydrenol® and Lorol® of BASF; Kalcol® 2465, Kalcol® 2470, Kalcol® 8655 of Kao Corporation, as well as Ecorol® 80, Ecorol® 24, Ecorol® 26, Ecorol® 28, and Ecorol® 68 of Ecogreen Oleochemicals. Further examples of monomers include alkyl methacrylates with branched chain alcohol-derived groups which may be obtained, for example, by reaction of a methacrylic acid (by direct esterification) or methyl methacrylate (by transesterification) with Guerbet alcohols. Examples of Guerbet alcohols include 2-butyloctanol, 2-butyldecanol, 2-hexyloctanol, 2-hexyldecanol, 2-octyldecanol, 2-hexyldodecanol, 2-octyldodecanol, 2-decyltetradecanol, 2-dodecylhexadecanol, and 2-tetradecyloctadecanol.

Aromatic monomers may also be employed to prepare the vinyl terminated polymethacrylate polymer and can include, for example, benzyl methacrylate. In another embodiment, the aromatic monomers may be selected from phenyl methacrylate, phenylpropyl methacrylate or styrene. It is contemplated that other oil insoluble methacrylate monomers that are polymerizable in oil may also be used. Mixtures of these and other oil insoluble monomers may also be used in the present invention.

As mentioned above, the vinyl terminated polymethacrylate polymer is synthesized by catalytic chain transfer polymerization ("CCTP") in which the desired monomers are reacted with a catalytic amount of a chain transfer agent. Examples of catalytic chain transfer agents can include, but are not limited to, low-spin Co(II) complexes such as Cobaloxime [J. Am. Chem. Soc., 1984, 106, 5197-5202] and derivatives thereof.

Once prepared, the vinyl terminated polymethacrylate polymer can then be reacted with a nitrogen-containing group to form the LMWDPMA. The use of CCTP to prepare the vinyl terminated polymethacrylate polymer results in a polymer having a single functional chain-end at which to attach the nitrogen-containing group, which may be contrasted with the normally employed free radical polymerization that does not result in a functional chain end. The LMWDPMA may be represented by formula II below:

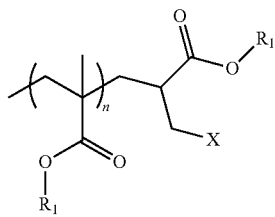

Formula II where R1 and n are as set forth above, and X is a nitrogen-containing group, as discussed further below.

In an embodiment, the addition of the nitrogen-containing group to the vinyl terminated polymethacrylate polymer can occur in the presence of microwave radiation. It has been found that such an addition in the presence of microwave radiation results in dramatically reduced reaction times (e.g., 100% conversion after 1 hour) in comparison to the commonly used simple Michael addition, which results in longer reaction periods (e.g., 100% conversion after 24 hours).

The nitrogen-containing compound may include aromatic amines, such as amines wherein a carbon atom of the aromatic ring structure is attached directly to the amino nitrogen. The amines may be monoamines or polyamines. The aromatic ring will typically be a mononuclear aromatic ring (i.e., one derived from benzene) but can include fused aromatic rings, such as those derived from naphthalene. Examples of aromatic amines include aniline, N-alkylanilines such as N-methyl aniline, and N-butylaniline, di-(para-methylphenyl)amine, naphthylamine, 4-aminodiphenylamine, N,N-dimethylphenylenediamine, 4-(4-nitrophenylazo) aniline (disperse orange 3), sulfamethazine, 4-phenoxyaniline, 3-nitroaniline, 4-aminoacetanilide, 4-amino-2-hydroxy-benzoic acid phenyl ester (phenyl amino salicylate), N-(4-amino-5-methoxy-2-methyl-phenyl)-benzamide (fast violet B), N-(4-amino-2,5-dimethoxyphenyl)-benzamide (fast blue RR), N-(4-amino-2,5-diethoxy-phenyl)-benzamide (fast blue BB), N-(4-aminophenyl)-benzamide and 4-phenylazoaniline. Other examples include para-ethoxyaniline, para-dodecylaniline, cyclohexyl-substituted naphthylamine, and thienyl-substituted aniline. Examples of other suitable aromatic amines include amino-substituted aromatic compounds and amines in which an amine nitrogen is a part of an aromatic ring, such as 3-aminoquinoline, 5-aminoquinoline, and 8-aminoquinoline. Also included are aromatic amines such as 2-aminobenzimidazole, which contains one secondary amino group attached directly to the aromatic ring and a primary amino group attached to the imidazole ring. Other amines include N-(4-anilinophenyl)-3-aminobutanamide (i.e., $\phi$-NH-$\phi$-NH—COCH$_2$CH(CH$_3$)NH$_2$). Additional aromatic amines include aminocarbazoles, aminoindoles, aminopyrroles, amino-indazolinones, aminoperimidines, mercaptotriazoles, aminophenothiazines, aminopyridiens, aminopyrazines, aminopyrimidines, pyridines, pyrazines, pyrimidines, aminothiadiazoles, aminothiothiadiazoles, and aminobenzotriaozles. Other suitable amines include 3-amino-N-(4-anilinophenyl)-N-isopropyl butanamide, and N-(4-anilinophenyl)-3-{(3-aminopropyl)-(cocoalkyl)amino} butanamide. Other aromatic amines which can be used include various aromatic amine dye intermediates containing multiple aromatic rings linked by, for example, amide structures. Examples include materials of the general structure $\phi$-CONH-$\phi$-NH$_2$ where the phenyl groups may be substituted. Suitable aromatic amines include those in which the amine nitrogen is a substituent on an aromatic carboxylic compound, that is, the nitrogen is not sp$^2$ hybridized within an aromatic ring.

The nitrogen-containing compound may also include non-aromatic amines, or in other words, an amine in which an amino nitrogen is not attached directly to a carbon atom of an aromatic ring, or in which an amine nitrogen is not a part of an aromatic ring, or in which an amine nitrogen is not a substituent on an aromatic carboxylic compound. In some instances such non-aromatic amines may be considered to be aliphatic, or cycloaliphatic. Such amines may be straight, or branched or functionalized with some functional group. The non-aromatic amines can include monoamines having, e.g., 1 to 8 carbon atoms, such as methylamine, ethylamine, and propylamine, as well as various higher amines. Diamines or polyamines can also be used, and typically will have only a single primary amino group. Examples include dimethylaminopropylamine, diethylaminopropylamine, dibutylaminopropylamine, dimethylaminoethylamine, diethylaminoethylamine, dibutylaminoethylamine, 1-(2-aminoethyl) piperidine, 1-(2-aminoethyl)pyrrolidone, N,N-dimethylethylamine; 3-(dimethylamino)-1-propylamine; O-(2-aminopropyl)-O'-(2-methoxyethyl)polypropylene glycol; N,N-dimethyldipropylenetri amine, aminoethylmorpholine, 3-morpholinopropylamine; aminoethylethyleneurea and aminopropylmorpholine.

In certain embodiments non-aromatic amines can be used alone or in combination with each other or in combination with aromatic amines. The amount of aromatic amine may, in some embodiments, be a minor amount compared with the amount of the non-aromatic amines, or in some instance, the composition may be substantially free or free of aromatic amine.

In certain embodiments aromatic amines can be used alone or in combination with each other or in combination with non-aromatic amines. The amount of non-aromatic amine may, in some embodiments, be a minor amount compared with the amount of the aromatic amines, or in some instance, the composition may be substantially free or free of non-aromatic amine.

The lubricating compositions of the present invention comprise 0.1 wt % to 10 wt %, or 0.25 wt % to 8 wt %, or 0.5 to 5 wt % of the LMWDPMA as described herein.

Lubricant Composition

The present technology includes a lubricant composition containing the aforementioned LMWDPMA, an oil of lubricating viscosity, and other optional performance additives suitable for use in an engine oil lubricant.

Oils of Lubricating Viscosity

The lubricating composition comprises an oil of lubricating viscosity. Such oils include natural and synthetic oils, oil derived from hydrocracking, hydrogenation, and hydrofinishing, unrefined, refined, re-refined oils or mixtures thereof. A more detailed description of unrefined, refined and re-refined oils is provided in International Publication WO2008/147704, paragraphs [0054] to [0056] (a similar disclosure is provided in US Patent Application 2010/197536, see [0072] to [0073]). A more detailed description of natural and synthetic lubricating oils is described in paragraphs [0058] to [0059] respectively of WO2008/147704 (a similar disclosure is provided in US Patent Application 2010/197536, see [0075] to [0076]). Synthetic oils may also be produced by Fischer-Tropsch reactions and typically may be hydroisomerised Fischer-Tropsch hydrocarbons or waxes. In one embodiment oils may be prepared by a Fischer-Tropsch gas-to-liquid synthetic procedure as well as other gas-to-liquid oils.

Oils of lubricating viscosity may also be defined as specified in April 2008 version of "Appendix E—API Base Oil Interchangeability Guidelines for Passenger Car Motor Oils and Diesel Engine Oils", section 1.3 Sub-heading 1.3. "Base Stock Categories". The API Guidelines are also summarised in U.S. Pat. No. 7,285,516 (see column 11, line 64 to column 12, line 10).

In one embodiment the oil of lubricating viscosity may be an API Group I to IV mineral oil, an ester or a synthetic oil, or mixtures thereof. In one embodiment the oil of lubricating viscosity may be an API Group II, Group III, Group IV mineral oil, an ester or a synthetic oil, or mixtures thereof.

The amount of the oil of lubricating viscosity present is typically the balance remaining after subtracting from 100 wt % the sum of the amount of the additives of the invention and the other performance additives.

The lubricating composition may be in the form of a concentrate and/or a fully formulated lubricant. If the lubricating composition of the invention (comprising the additives disclosed herein) is in the form of a concentrate which may be combined with additional oil to form, in whole or in part, a finished lubricant), the ratio of the of these additives to the oil of lubricating viscosity and/or to diluent oil include the ranges of 1:99 to 99:1 by weight, or 80:20 to 10:90 by weight. Typically the lubricating composition of the invention comprises at least 50 wt %, or at least 60 wt %, or at least 70 wt %, or at least 80 wt % of an oil of lubricating viscosity.

In the present invention, the lubricating composition comprises a base oil having a kinematic viscosity measured at 100° C. of 3.0 m$^2$/s to 6.0 m$^2$/s, for example, 3.4 m$^2$/s to 5.6 m$^2$/s.

Other Performance Additives

A lubricating composition may be prepared by adding the LMWDPMA to an oil of lubricating viscosity, optionally in the presence of other performance additives (as described herein below).

The lubricating composition of the invention optionally comprises other performance additives. The other performance additives include at least one of metal deactivators, viscosity modifiers, detergents, friction modifiers, corrosion inhibitors, dispersants, extreme pressure agents, antioxidants, foam inhibitors, demulsifiers, pour point depressants, seal swelling agents and mixtures thereof. Typically, fully-formulated lubricating oil will contain one or more of these performance additives.

In one embodiment the invention provides a lubricating composition further comprising an overbased metal-containing detergent. The metal of the metal-containing detergent may be zinc, sodium, calcium, barium, or magnesium. Typically the metal of the metal-containing detergent may be sodium, calcium, or magnesium.

The overbased metal-containing detergent may be selected from the group consisting of non-sulfur containing phenates, sulfur containing phenates, sulfonates, salixarates, salicylates, and mixtures thereof, or borated equivalents thereof. The overbased detergent may be borated with a borating agent such as boric acid.

The lubricating composition may further comprise a zinc dialkyldithiophosphate anti-wear agent. Zinc dialkyldithiophosphates are known in the art. Examples of zinc dithiophosphates include zinc isopropyl methylamyl dithiophosphate, zinc isopropyl isooctyl dithiophosphate, zinc di(cyclohexyl) dithiophosphate, zinc isobutyl 2-ethylhexyl dithiophosphate, zinc isopropyl 2-ethylhexyl dithiophosphate, zinc isobutyl isoamyl dithiophosphate, zinc isopropyl n-butyl dithiophosphate, and combinations thereof. Zinc dialkyldithiophosphate may be present in amount to provide 0 weight percent to 0.03 weight percent phosphorus to the lubricating composition. In one embodiment, the lubricating composition can be free of or substantially free of zinc dialkyldithiophosphate.

The lubricating composition in a further embodiment comprises an antioxidant, wherein the antioxidant comprises a phenolic or an aminic antioxidant or mixtures thereof. The antioxidants include diarylamines, alkylated diarylamines, hindered phenols, or mixtures thereof. When present the antioxidant is present at 0.1 wt % to 3 wt %, or 0.5 wt % to 2.75 wt %, or 1 wt % to 2.5 wt % of the lubricating composition.

In one embodiment the lubricant composition may include a friction modifier. The friction modifier may be selected from the group consisting of long chain fatty acid derivatives of amines, long chain fatty esters, or derivatives of long chain fatty epoxides; fatty imidazolines; amine salts of alkylphosphoric acids; fatty alkyl tartrates; fatty alkyl tartrimides; fatty alkyl tartramides; fatty glycolates; and fatty glycolamides. The friction modifier may be present at 0 wt % to 6 wt %, or 0.01 wt % to 4 wt %, or 0.05 wt % to 2 wt %, or 0.1 wt % to 2 wt % of the lubricating composition. As used herein the term "fatty alkyl" or "fatty" in relation to friction modifiers means a carbon chain having 10 to 22 carbon atoms, typically a straight carbon chain.

Another class of additives that may be employed in the lubricant composition includes oil-soluble titanium compounds as disclosed in U.S. Pat. No. 7,727,943 and US2006/0014651. The oil-soluble titanium compounds may function as additional antiwear agents, friction modifiers, antioxidants, deposit control additives, or more than one of these functions. In one embodiment the oil soluble titanium compound is a titanium (IV) alkoxide. The titanium alkoxide is formed from a monohydric alcohol, a polyol or mixtures thereof. The monohydric alkoxides may have 2 to 16, or 3 to 10 carbon atoms. In one embodiment, the titanium alkoxide is titanium (IV) isopropoxide. In one embodiment, the titanium alkoxide is titanium (IV) 2-ethylhexoxide. In one embodiment, the titanium compound comprises the alkoxide of a vicinal 1,2-diol or polyol. In one embodiment, the 1,2-vicinal diol comprises a fatty acid mono-ester of glycerol, often the fatty acid is oleic acid. In one embodiment, the oil soluble titanium compound is a titanium carboxylate. In a further embodiment the titanium (IV) carboxylate is titanium neodecanoate.

The lubricant composition may contain an extreme pressure agent. Extreme Pressure (EP) agents that are soluble in the oil include sulfur- and chlorosulfur-containing EP agents, dimercaptothiadiazole or CS$_2$ derivatives of dispersants (typically succinimide dispersants), derivative of chlorinated hydrocarbon EP agents and phosphorus EP agents. Examples of such EP agents include chlorinated wax; sulfurized olefins (such as sulfurized isobutylene), a hydrocarbyl-substituted 2,5-dimercapto-1,3,4-thiadiazole, or oligomers thereof, organic sulfides and polysulfides such as dibenzyldisulfide, bis-(chlorobenzyl) disulfide, dibutyl tetrasulfide, sulfurized methyl ester of oleic acid, sulfurized alkylphenol, sulfurized dipentene, sulfurized terpene, and sulfurized Diels-Alder adducts; phosphosulfurized hydrocarbons such as the reaction product of phosphorus sulfide with turpentine or methyl oleate; phosphorus esters such as the dihydrocarbon and trihydrocarbon phosphites, e.g., dibutyl phosphite, diheptyl phosphite, dicyclohexyl phosphite, pentylphenyl phosphite; dipentylphenyl phosphite, tridecyl phosphite, distearyl phosphite and polypropylene substituted phenol phosphite; metal thiocarbamates such as zinc dioctyldithiocarbamate and barium heptylphenol diacid; amine salts of alkyl and dialkylphosphoric acids or derivatives including, for example, the amine salt of a reaction product of a dialkyldithiophosphoric acid with propylene oxide and subsequently followed by a further reaction with P$_2$O$_5$; and mixtures thereof (as described in U.S. Pat. No. 3,197,405).

Foam inhibitors that may be useful in the compositions of the invention include polysiloxanes, copolymers of ethyl acrylate and 2-ethylhexylacrylate and optionally vinyl acetate; demulsifiers including fluorinated polysiloxanes, trialkyl phosphates, polyethylene glycols, polyethylene oxides, polypropylene oxides and (ethylene oxide-propylene oxide) polymers.

Pour point depressants that may be useful in the compositions of the invention include polyalphaolefins, esters of maleic anhydride-styrene copolymers, polymethacrylates, polyacrylates or polyacrylamides.

Demulsifiers include trialkyl phosphates, and various polymers and copolymers of ethylene glycol, ethylene oxide, propylene oxide, or mixtures thereof.

Metal deactivators include derivatives of benzotriazoles (typically tolyltriazole), 1,2,4-triazoles, benzimidazoles, 2-alkyldithiobenzimidazoles or 2-alkyldithiobenzothiazoles. The metal deactivators may also be described as corrosion inhibitors.

Seal swell agents include sulfolene derivatives Exxon Necton-37™ (FN 1380) and Exxon Mineral Seal Oil™ (FN 3200).

Other seal swell agents include those of the compound represented by formula (A)

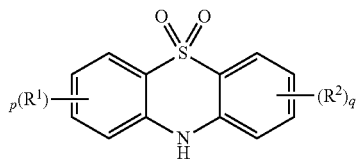

(A)

wherein: $R^1$ and $R^2$ are each independently a hydrocarbyl group containing from about 4 to about 18 carbon atoms; p and q are each independently 0 or an integer from 1 to 3, and the sum of p and q is 1, 2, 3, 4, 5, or 6. Such compounds are discussed further in WO2017/205270 published Nov. 30, 2017.

Other seal swell agents include those of the compound represented by formula (B)

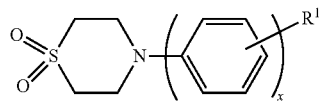

(B)

wherein x is 0 or 1 and $R^1$ is a hydrocarbyl group containing about 4 to about 18 carbon atoms. Such compounds are discussed further in WO2017/205271, published Nov. 30, 2017

Other seal swell agents include those of the compound represented by formula (C)

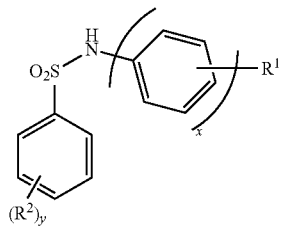

(C)

wherein: x is 0 or 1; $R^1$ is a hydrocarbyl group containing about 4 or about 18 carbon atoms; $R^2$ is an aliphatic hydrocarbyl group containing about 1 to about 12 carbon atoms; and y is 0 or 1. Such compounds are discussed further in WO2017/205274, published, Nov. 30, 2017.

INDUSTRIAL APPLICATION

The LMWDPMA may be employed in an internal combustion engine. The internal combustion engine may be a 4-stroke engine. The internal combustion engine may or may not have an Exhaust Gas Recirculation system. The internal combustion engine may be fitted with an emission control system or a turbocharger. Examples of the emission control system include diesel particulate filters (DPF), or systems employing selective catalytic reduction (SCR).

In one embodiment the internal combustion engine may be a diesel fueled engine, a gasoline fueled engine, a natural gas fueled engine or a mixed gasoline/alcohol fueled engine. In one embodiment the internal combustion engine may be a diesel fueled engine and in another embodiment a gasoline fueled engine. In one embodiment the internal combustion engine may be a heavy duty diesel engine. In still another embodiment, the internal combustion engine may be a gasoline direct injection engine.

The sulfur content of the lubricating composition may be 1 wt % or less, or 0.8 wt % or less, or 0.5 wt % or less, or 0.3 wt % or less. In one embodiment the sulfur content may be in the range of 0.001 wt % to 0.5 wt %, or 0.01 wt % to 0.3 wt %. The phosphorus content may be 0.2 wt % or less, or 0.12 wt % or less, or 0.1 wt % or less, or 0.085 wt % or less, or 0.08 wt % or less, or even 0.06 wt % or less, 0.055 wt % or less, or 0.05 wt % or less. In one embodiment the phosphorus content may be 0.04 wt % to 0.12 wt %. In one embodiment the phosphorus content may be 100 ppm to 1000 ppm, or 200 ppm to 600 ppm. The total sulfated ash content may be 0.3 wt % to 1.2 wt %, or 0.5 wt % to 1.1 wt % of the lubricating composition. In one embodiment the sulfated ash content may be 0.5 wt % to 1.1 wt % of the lubricating composition.

The lubricating composition may have a SAE viscosity grade of XW-Y, wherein X may be 0, 5, 10, or 15; and Y may be 8, 12, 16, 20, 30, or 40.

In one embodiment of the invention, the lubricating composition as described herein will have an evaporative percent weight loss (Noack), as measured by ASTM D5800, of less than 15% or of less than 14%, or less than 13%.

The following examples provide illustrations of the invention. These examples are non-exhaustive and are not intended to limit the scope of the invention.

EXAMPLES

PLMA-A: Synthesis of polylauryl methacrylate (PLMA-A) via catalytic chain transfer polymerization. Bis[(difluoroboryl) dimethyl phenyl-glyoximato] cobalt(II) (Co(MePh) BF) (21.20 mg) and a stirring bar were charged into a 1 L round bottom flask. Nitrogen was purged into the flask for 60 minutes. Subsequently, 400 ml of lauryl methacrylate (1.365 mol) previously deoxygenated for 30 minutes, was added to the flask via a deoxygenated syringe. The mixture was stirred under a nitrogen atmosphere until the dissolution of the catalyst. Meanwhile, a solution of dimethyl 2,2'-azobis (2-methyl propionate) (V601, 3.14 g, 0.014 mol, 1 mol % relative to monomer) and 400 ml toluene (equal volume to monomer) was charged into a 500 mL round bottom flask and purged with nitrogen for 30 min. Subsequently, the monomer and catalyst solution were heated under an inert atmosphere. When the temperature of the catalyst solution reached 75° C., the initiator solution was added. The reaction was continued for 6 hours under continuous stirring. The final product was purified by precipitation in methanol yielding a viscous colorless liquid. PMLA-A had Mn of 2000; Mw of 3200 and PDI of 1.61.

PLMA-B: Synthesis of polylauryl methacrylate (PLMA-B) via catalytic chain transfer polymerization. Bis[(difluoroboryl) dimethyl phenyl-glyoximato] cobalt(II) (Co(MePh) BF) (18.81 mg) and a stirring bar were charged into a 1 L round bottom flask. Nitrogen was purged into the flask for 60 minutes. Subsequently, 400 ml of lauryl methacrylate (1.365 mol) previously deoxygenated for 30 minutes, was added to the flask via a deoxygenated syringe. The mixture was stirred under a nitrogen atmosphere until the dissolution of the catalyst. Meanwhile, a solution of dimethyl 2,2'-azobis (2-methyl propionate) (V601, 3.14 g, 0.014 mol, 1 mol % relative to monomer) and 400 ml toluene (equal volume to monomer) was charged into a 500 mL round bottom flask and purged with nitrogen for 30 min. Subsequently, the monomer and catalyst solution were heated under an inert atmosphere. When the temperature of the catalyst solution reached 75° C., the initiator solution was added. The reaction was continued for 6 hours under continuous stirring. The final product was purified by precipitation in methanol yielding a viscous colorless liquid. PLMA-B had an Mn of 2200; Mw of 4200 and PDI of 1.91.

Method of Dispersant Preparation

Method 1: Conventional heating with an oil bath—PLMA-B (0.5 g, 0.23 mmol, $M_n$=2200 g/mol, PDI=1.91), hexylamine (90 µl, 0.69 mmol, 3 equivalent relative to macromonomer's vinyl group), 1,8-Diazabicyclo(5.4.0)undec-7-ene (DBU, 90 µl, 0.60 mmol, 1/1 v/v to amine) and a stirring bar were added to a 20 ml vial. The temperature was 40° C. and the duration of the experiment 24 hours. The final product was purified by precipitation in methanol. Conversion by NMR: 99.9%, Yield: 95%.

Method 2: Microwave reactor—PLMA-B (0.5 g, 0.23 mmol, $M_n$=2200 g/mol, PDI=1.91), hexylamine (90 µl, 0.69 mmol, 3 equivalent relative to macromonomer's vinyl group), 1,8-Diazabicyclo(5.4.0)undec-7-ene (DBU, 90 µl, 0.60 mmol, 1/1 v/v to amine) and a stirring bar were added to a 5 ml microwave reactor vial. The vial was sealed and placed in the microwave reactor. The pressure was set up to 4 bar, the temperature at 40° C. and the duration for 2 hours. The final product was purified by precipitation in methanol. Conversion by NMR: 99.9%, Yield: 95%.

Comparisons of reaction time and conversion when using Method 2 microwave vs Method 1 conventional heating are shown in the table below.

| Heating source | Solvent | Temperature (° C.) | Time (h) | Conversion by NMR (%) |
| --- | --- | --- | --- | --- |
| Oil bath | No | 40 | 24 | 99.9 |
| Microwave | No | 40 | 2 | 99.9 |
| Microwave | No | 180 | 1 | 99.9 |
| Oil bath | Yes | 40 | 24 | 22 |
| Microwave | Yes | 40 | 2 | 69 |

The microwave functionalization method gave higher conversion at shorter reaction times compared to using an oil bath to promote functionalization of the polymer with amine both in the presence and absence of a solvent.

Dispersant Evaluation

Dispersants according to the disclosed technology were prepared employing the Method 2 microwave method to evaluate for performance versus standard dispersant polymethacrylate.

Dispersant 1—Macromonomer PLMA-A (10 g, 5 mmol, Mn=2000 g/mol, PDI=1.61), 3-(Dimethylamino)-1-propylamine (6.29 ml, 50 mmol, 10 equivalents relative to macromonomer's vinyl group), 4 ml toluene, and a stirring bar were added to a 20 ml microwave reactor vial. The vial was sealed and placed in the microwave reactor. The pressure was set up to 4 bar, while the temperature at 180° C. and the duration at 2 hours. The final product was purified by precipitation in methanol. Conversion by NMR: 99.9%, Yield: 94%.

Dispersant 2—Macromonomer PLMA-A (10 g, 5 mmol, Mn=2000 g/mol, PDI=1.61), 3-Morpholinopropylamine (7.30 ml, 50 mmol, 10 equivalents relative to macromonomer's vinyl group), 4 ml toluene, and a stirring bar were added to a 20 ml microwave reactor vial. The vial was sealed and placed in the microwave reactor. The pressure was set up to 4 bar, while the temperature at 180° C. and the duration at 2 hours. The final product was purified by precipitation in methanol. Conversion by NMR: 99.9%, Yield: 94%.

Dispersant 3 (Comparative)—A 3 L flange flask equipped with an overhead stirrer, Dean Stark trap, nitrogen inlet and a thermocouple was initially charged with 1000 g (0.79 mol) of polyisobutenyl succinic anhydride (the polyisobutenyl substituent had a $\overline{M}_n$ of about 1550) and diluent oil (425.7 g). The nitrogen flow through the vessel was set at 1 cubic foot per hour and the reaction mixture was heated to 90° C. Once at temperature, 42.2 g (0.29 mol) of TETA was added sub-surface over 1 hour. An exotherm is observed and the controlled addition of amine is conducted to maintain the reaction temperature below 120° C. After completion of the addition, the reaction mixture was heated to 150° C. and stirred at that temperature for a further 4 hours. As the reaction progresses, water is produced which is removed using the Dean-Stark trap. The progress of the reaction is monitored by IR, whereby formation of the cyclic imide and carboxylate group could be observed. The resultant material was cooled to 60° C. and collected to yield the product.

Dispersant 4 (Comparative)—A 2 L flange flask equipped with an overhead stirrer, Dean Stark trap, nitrogen inlet and a thermocouple was initially charged with 1000 g (1.07 mol) of polyisobutenyl succinic anhydride (the polyisobutenyl substituent had a $\overline{M}_n$ of about 1000). The nitrogen flow through the vessel was set at 1 cubic foot per hour and the reaction mixture was heated to 90° C. Once at temperature, 109.3 g (1.07 mol) of 3-(dimethylamino)propylamine was added sub-surface over 1 hour. An exotherm is observed and the controlled addition of amine is conducted to maintain the reaction temperature below 120° C. After completion of the addition, the reaction mixture was heated to 150° C. and stirred at that temperature for a further 2 hours. As the reaction progresses, water is produced which is removed using the Dean-Stark trap. The progress of the reaction is monitored by IR, whereby formation of the cyclic imide product could be observed. The resultant material was cooled to 60° C. and collected to yield the product.

Dispersant 5 (Comparative) Synthesis of polylauryl methacrylate-Poly2-(dimethylamino)ethyl methacrylate copolymer (PLMA-co-PDMAEMA) via catalytic chain transfer polymerization. Bis[(difluoroboryl) dimethyl phenyl-glyoximato] cobalt(II) (Co(MePh)BF) (3 mg) and a stirring bar were charged into a 200 ml round bottom flask. Nitrogen was purged into the flask for 60 minutes. Subsequently, Lauryl methacrylate (50 ml, 0.17 mol), dimethylaminoethylmethacrylate (DMAEMA, 5.73 ml, 0.034 mol) and dimethyl 2,2'-azobis(2-methyl propionate) (V601, 471 mg, 1 mol % relative to monomers) previously deoxygenated for 30 minutes, was added to the flask via a deoxygenated syringe. The mixture was stirred under a nitrogen atmosphere until the dissolution of the catalyst. Subsequently, the solution was heated under an inert atmosphere for 6 hours under continuous stirring. The final product was purified by precipitation in methanol yielding a viscous colorless liquid. PLMA-C had an Mn of 2600; Mw of 4320 and PDI of 1.66.

A Summary of the dispersant structural features is provided in the table below.

|  | Backbone | Backbone Mn | Amine | Multiple primary N |
|---|---|---|---|---|
| Dispersant 1 | PLMA | 2000 | DMAPA | No |
| Dispersant 2 | PLMA | 2000 | APLM | No |
| Dispersant 3 (comp) | PIB | 1550 | TETA | Yes |
| Dispersant 4 (comp) | PIB | 1000 | DMAPA | No |
| Dispersant 5 (comp) | PLMA | 2600 | From N-containing monomer | No |

Dispersants 1-5 were blended into fully formulated lubricating oils according to the descriptions in the table below.

|  | Sample 1 | Sample 2 | Sample 3 | Sample 4 | Sample 5 | Sample 6 |
|---|---|---|---|---|---|---|
| Functionalized olefin copolymer | 2 | 2 | 2 | 2 | 2 | 2 |
| Alkaryl amine | 1 | 1 | 1 | 1 | 1 | 1 |
| Overbased detergents | 1.5 | 1.5 | 1.5 | 1.5 | 1.5 | 1.5 |
| ZDDP | 0.77 | 0.77 | 0.77 | 0.77 | 0.77 | 0.77 |
| Sulfurized olefin | 0.5 | 0.5 | 0.5 | 0.5 | 0.5 | 0.5 |
| Pour Point Depressant | 0.2 | 0.2 | 0.2 | 0.2 | 0.2 | 0.2 |
| Antifoam | 0.01 | 0.01 | 0.01 | 0.01 | 0.01 | 0.01 |
| Alkyl phenol ether | 1.5 | 1.5 | 1.5 | 1.5 | 1.5 | 1.5 |
| Dispersant 3 | 3.3 |  | 1.5 |  |  |  |
| Dispersant 4 |  | 3.3 |  |  |  |  |
| Dispersant 1 |  |  |  | 1.5 |  |  |
| Dispersant 2 |  |  |  |  | 1.5 |  |
| Dispersant 5 |  |  |  |  |  | 1.5 |
| Oil of lubricating viscosity | Sum to 100 | Sum to 100 | Sum to 100 | Sum to 100 | Sum to 100 | Sum to 100 |

Performance testing was conducted on Samples 1-6 as described here. Kinematic viscosity was measured at 100° C. and 40° C. according to ASTM D445. Low and high temperature viscometrics were also recorded for each sample. Low temperature performance was evaluated according to ASTM D5293, while high temperature viscometric performance was evaluated according to ASTM D4683. Oxidation stability was measured according to ASTM D6186. A micro coking test (MCT) was used to evaluate the deposit forming tendency of a fluid when subjected to high temperatures in an air environment. In this test a sample of oil is placed in the trough of an aluminum-alloy plate heated at one end (280° C.) and regulated at the other end (230° C.). The trough is set with a slant of 1.5 wt % towards the hot end. The duration of the test is 90 minutes. At the end of the test, the plates are rated from 1-10, with 10 having the least amount of deposits and 1 having the most amount of deposits.

|  | Sample 1 | Sample 2 | Sample 3 | Sample 4 | Sample 5 | Sample 6 |
|---|---|---|---|---|---|---|
| KV at 40° C. | 31.84 | 27.98 | 27.61 | 25.63 | 25.34 | 25.68 |
| KV at 100° C. | 6.407 | 5.705 | 5.748 | 5.416 | 5.376 | 5.448 |
| CCS at −35° C. | 4020 | 3740 | 3360 | 3090 | 3070 | 2990 |
| HTHS at 150° C. | 2.22 | 2 | 2.02 | 1.92 | 1.92 | 1.89 |
| PDSC | 98.3 | 92.9 | 103.3 | 103.5 | 104.3 | 82.5 |
| MCT Merit | 7.7 | 6.8 | 6.9 | 8.3 | 7 | 5.1 |

There are a variety of strategies that could be used to reduce the viscosity contribution of dispersants to fully formulated fluids. Reduction of the molecular weight of the hydrophobic chain can result in a lower viscosity dispersant. Substituting an amine capable of crosslinking with a non-crosslinking amine can also result in a lower viscosity dispersant and fully formulated fluid. Compare the results for Sample 1 vs. Sample 2 where the fluid dispersants differ by the characteristics just described. While the expected viscosity reduction is observed, the cleanliness performance of Sample 2 as a fully formulated fluid, also decreases. Another strategy for decreasing fluid viscosity would be to simply lower the treat rate of the dispersant. Compare Sample 3 vs. Sample 1. Again, the expected viscosity reduction is observed, as well as a reduction in cleanliness performance. Samples 4 and 5 allow for lower viscosity fluids (compared to Samples 1-3) without sacrificing cleanliness performance. Samples 4 and 5 are most accurately compared to Sample 3 given that the treat rate of the dispersant was identical for all fluids.

Poly(meth)acrylates containing amine monomers are well known. These are typically prepared by radical polymerization of (meth)acrylic ester monomers with (meth)acrylic amine containing monomers. The resulting copolymer contains a mixture of amine containing monomers and ester containing monomers. The amine containing monomers are distributed randomly throughout the polymer. The molecular weight of these traditionally prepared copolymers cannot be controlled to target an Mn of ~1500 to 3000 (A prohibitively large amount of initiator would need to be employed).

Using the catalytic chain transfer polymerization method described herein, a copolymer of acrylic ester and amine-containing acrylic monomer was prepared with a targeted Mn of 1500 to 3000. The resulting copolymer contained a random distribution of amine containing methacrylate monomer (See Dispersant 5). This can be compared to the end functionalized inventive dispersants described herein. A comparison of the performance results for Sample 6 vs. Samples 4 and/or 5 shows the importance of end functionalization of the polymer.

It is known that some of the materials described above may interact in the final formulation, so that the components of the final formulation may be different from those that are initially added. The products formed thereby, including the products formed upon employing lubricant composition of the present invention in its intended use, may not be susceptible of easy description. Nevertheless, all such modifications and reaction products are included within the scope of the present invention; the present invention encompasses lubricant composition prepared by admixing the components described above.

Each of the documents referred to above is incorporated herein by reference. Except in the Examples, or where otherwise explicitly indicated, all numerical quantities in this description specifying amounts of materials, reaction conditions, molecular weights, number of carbon atoms, and the like, are to be understood as modified by the word "about." Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil, which may be customarily present in the commercial material, unless otherwise indicated. It is to be understood that the upper and lower amount, range, and ratio limits set forth herein may be independently combined. Similarly, the ranges and amounts for each element of the invention may be used together with ranges or amounts for any of the other elements.

As used herein, the term "hydrocarbyl substituent" or "hydrocarbyl group" is used in its ordinary sense, which is well-known to those skilled in the art. Specifically, it refers to a group having a carbon atom directly attached to the remainder of the molecule and having predominantly hydrocarbon character. Examples of hydrocarbyl groups include: hydrocarbon substituents, including aliphatic, alicyclic, and aromatic substituents; substituted hydrocarbon substituents, that is, substituents containing non-hydrocarbon groups which, in the context of this invention, do not alter the predominantly hydrocarbon nature of the substituent; and hetero substituents, that is, substituents which similarly have a predominantly hydrocarbon character but contain other than carbon in a ring or chain. A more detailed definition of the term "hydrocarbyl substituent" or "hydrocarbyl group" is described in paragraphs [0118] to [0119] of International Publication WO2008147704, or a similar definition in paragraphs [0137] to [0141] of published application US 2010-0197536.

As used herein the detergent total base number (TBN) may be measure by ASTM D2896.

As used herein, the transitional term "comprising," which is synonymous with "including," "containing," or "characterized by," is inclusive or open-ended and does not exclude additional, un-recited elements or method steps. However, in each recitation of "comprising" herein, it is intended that the term also encompass, as alternative embodiments, the phrases "consisting essentially of" and "consisting of," where "consisting of" excludes any element or step not specified and "consisting essentially of" permits the inclusion of additional un-recited elements or steps that do not materially affect the essential or basic and novel characteristics of the composition or method under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

A low molecular weight dispersant polymethacrylate polymer ("LMWDPMA") comprising the reaction product of a vinyl terminated polymethacrylate polymer having a molecular weight of about 1000 to about 5000 Mn and a nitrogen-containing group.

The LMWDPMA the paragraph above wherein vinyl terminated polymethacrylate polymer is synthesized by catalytic chain transfer polymerization ("CCTP") of at least one methacrylate monomer reacted with a catalytic amount of a catalytic chain transfer agent.

The LMWDPMA of any paragraph above wherein the at least one methacrylate monomer comprises monomers derived from saturated alcohols.

The LMWDPMA of any paragraph above wherein the at least one methacrylate monomer comprises methyl methacrylate. The LMWDPMA of any sentence above wherein the at least one methacrylate monomer comprises ethyl methacrylate. The LMWDPMA of any sentence above wherein the at least one methacrylate monomer comprises propyl methacrylate. The LMWDPMA of any sentence above wherein the at least one methacrylate monomer comprises butyl methacrylate. The LMWDPMA of any sentence above wherein the at least one methacrylate monomer comprises 2-methylpentyl methacrylate. The LMWDPMA of any sentence above wherein the at least one methacrylate monomer comprises 2-propylheptyl methacrylate. The LMWDPMA of any sentence above wherein the at least one methacrylate monomer comprises 2-butyloctyl methacrylate. The LMWDPMA of any sentence above wherein the at least one methacrylate monomer comprises 2-ethylhexyl methacrylate. The LMWDPMA of any sentence above wherein the at least one methacrylate monomer comprises octyl methacrylate. The LMWDPMA of any sentence above wherein the at least one methacrylate monomer comprises nonyl methacrylate. The LMWDPMA of any sentence above wherein the at least one methacrylate monomer comprises isooctyl methacrylate. The LMWDPMA of any sentence above wherein the at least one methacrylate monomer comprises isononyl methacrylate. The LMWDPMA of any sentence above wherein the at least one methacrylate monomer comprises 2-tert-butylheptyl methacrylate. The LMWDPMA of any sentence above wherein the at least one methacrylate monomer comprises 3-isopropylheptyl methacrylate. The LMWDPMA of any sentence above wherein the at least one methacrylate monomer comprises decyl methacrylate. The LMWDPMA of any sentence above wherein the at least one methacrylate monomer comprises undecyl methacrylate. The LMWDPMA of any sentence above wherein the at least one methacrylate monomer comprises 5-methylundecyl methacrylate. The LMWDPMA of any sentence above wherein the at least one methacrylate monomer comprises dodecyl methacrylate. The LMWDPMA of any sentence above wherein the at least one methacrylate monomer comprises 2-methyldodecyl methacrylate. The LMWDPMA of any sentence above wherein the at least one methacrylate monomer comprises tridecyl methacrylate. The LMWDPMA of any sentence above wherein the at least one methacrylate monomer comprises 5-methyltridecyl methacrylate. The LMWDPMA of any sentence above wherein the at least one methacrylate monomer comprises tetradecyl methacrylate. The LMWDPMA of any sentence above wherein the at least one methacrylate monomer comprises pentadecyl methacrylate. The LMWDPMA of any sentence above wherein the at least one methacrylate monomer comprises hexadecyl methacrylate. The LMWDPMA of any sentence above wherein the at least one methacrylate monomer comprises 2-methylhexadecyl methacrylate. The LMWDPMA of any sentence above wherein the at least one methacrylate monomer comprises heptadecyl methacrylate. The LMWDPMA of any sentence above wherein the at least one methacrylate monomer comprises 5-isopropylheptadecyl methacrylate. The LMWDPMA of any sentence above wherein the at least one methacrylate monomer comprises 4-tert-butyloctadecyl methacrylate. The LMWDPMA of any sentence above wherein the at least one methacrylate monomer comprises 5-ethyloctadecyl methacrylate. The LMWDPMA of any sentence above wherein the at least one methacrylate monomer comprises 3-isopropyloctadecyl-methacrylate. The LMWDPMA of any sentence above wherein the at least one methacrylate monomer comprises octadecyl methacrylate. The LMWDPMA of any sentence above wherein the at least one methacrylate monomer comprises nonadecyl methacrylate. The LMWDPMA of any sentence above wherein the at least one methacrylate monomer comprises eicosyl methacrylate. The LMWDPMA of any sentence above wherein the at least one methacrylate monomer comprises methacrylates derived from unsaturated alcohols. The LMWDPMA of any sentence above wherein the at least one methacrylate monomer comprises oleyl methacrylate. The LMWDPMA of any sentence above wherein the at least one methacrylate monomer comprises cycloalkyl methacrylates. The LMWDPMA of any sentence above wherein the at least one methacrylate monomer comprises 3-vinyl-2-butylcyclohexyl methacrylate. The LMWDPMA of any sentence above wherein the at least one methacrylate monomer comprises bornyl methacrylate.

The LMWDPMA of any sentence above wherein the at least one methacrylate monomer comprises alkyl methacrylates with long-chain alcohol-derived groups from long-chain fatty alcohols. The LMWDPMA of any sentence above wherein the fatty alcohol comprises Nafol® 1620. The LMWDPMA of any sentence above wherein the fatty alcohol comprises Alfol® 10. The LMWDPMA of any sentence above wherein the fatty alcohol comprises Alfol® 810. The LMWDPMA of any sentence above wherein the fatty alcohol comprises Alfol® 12. The LMWDPMA of any sentence above wherein the fatty alcohol comprises Alfol® 1012EE. The LMWDPMA of any sentence above wherein the fatty alcohol comprises Alfol® 1014CDC. The LMWDPMA of any sentence above wherein the fatty alcohol comprises Alfol® 1214. The LMWDPMA of any sentence above wherein the fatty alcohol comprises Alfol® 1214GC. The LMWDPMA of any sentence above wherein the fatty alcohol comprises Alfol® 1214HA. The LMWDPMA of any sentence above wherein the fatty alcohol comprises Alfol® 1216. The LMWDPMA of any sentence above wherein the fatty alcohol comprises and Lial® 125 of Sasol. The LMWDPMA of any sentence above wherein the fatty alcohol comprises Neodol® 91. The LMWDPMA of any sentence above wherein the fatty alcohol comprises Neodol® 23. The LMWDPMA of any sentence above wherein the fatty alcohol comprises Neodol® 25, Neodol® 45. The LMWDPMA of any sentence above wherein the fatty alcohol comprises Neodol® 135. The LMWDPMA of any sentence above wherein the fatty alcohol comprises C13-C15 Alcohol. The LMWDPMA of any sentence above wherein the fatty alcohol comprises Isotridecanol. The LMWDPMA of any sentence above wherein the fatty alcohol comprises Hydrenol®. The LMWDPMA of any sentence above wherein the fatty alcohol comprises Lorol®. The LMWDPMA of any sentence above wherein the fatty alcohol comprises Kalcol® 2465. The LMWDPMA of any sentence above wherein the fatty alcohol comprises Kalcol® 2470. The LMWDPMA of any sentence above wherein the fatty alcohol comprises Kalcol® 8655. The LMWDPMA of any sentence above wherein the fatty alcohol comprises Ecorol® 80. The LMWDPMA of any sentence above wherein the fatty alcohol comprises Ecorol® 24. The LMWDPMA of any sentence above wherein the fatty alcohol comprises Ecorol® 26. The LMWDPMA of any sentence above wherein the fatty alcohol comprises Ecorol® 28. The LMWDPMA of any sentence above wherein the fatty alcohol comprises Ecorol® 68.

The LMWDPMA of any sentence above wherein the at least one methacrylate monomer comprises alkyl methacrylates with branched chain alcohol-derived groups from Guerbet alcohols. The LMWDPMA of any sentence above wherein the Guerbet alcohol comprises 2-butyloctanol. The LMWDPMA of any sentence above wherein the Guerbet alcohol comprises 2-butyldecanol. The LMWDPMA of any sentence above wherein the Guerbet alcohol comprises 2-hexyloctanol. The LMWDPMA of any sentence above wherein the Guerbet alcohol comprises 2-hexyldecanol. The LMWDPMA of any sentence above wherein the Guerbet alcohol comprises 2-octyldecanol. The LMWDPMA of any sentence above wherein the Guerbet alcohol comprises 2-hexyldodecanol. The LMWDPMA of any sentence above wherein the Guerbet alcohol comprises 2-octyldodecanol. The LMWDPMA of any sentence above wherein the Guerbet alcohol comprises 2-decyltetradecanol. The LMWDPMA of any sentence above wherein the Guerbet alcohol comprises 2-dodecylhexadecanol. The LMWDPMA of any sentence above wherein the Guerbet alcohol comprises 2-tetradecyloctadecanol.

The LMWDPMA of any sentence above wherein the methacrylate monomer comprises benzyl methacrylate. The LMWDPMA of any sentence above wherein the methacrylate monomer comprises phenyl methacrylate. The LMWDPMA of any sentence above wherein the methacrylate monomer comprises phenylpropyl methacrylate. The LMWDPMA of any sentence above wherein the methacrylate monomer comprises styrene methacrylate.

The LMWDPMA of any sentence above wherein the methacrylate monomer comprises oil insoluble methacrylate monomers that are polymerizable in oil. The LMWDPMA of any sentence above wherein the methacrylate monomer comprises mixtures of any of the foregoing monomers.

The LMWDPMA of any sentence above wherein the vinyl terminated polymethacrylate polymer comprises a polymer of formula 1:

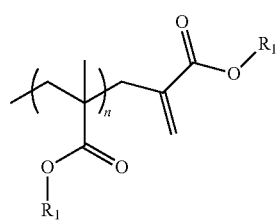

Formula I where $R_1$ is an alkyl group of 1 to 24 carbon atoms; and n is an integer of 3 to 30.

The LMWDPMA of any previous sentence, wherein the LMWDPMA may be represented by formula II below:

Formula II

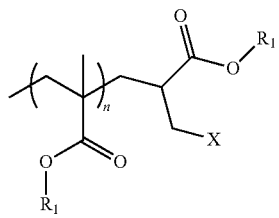

where $R_1$ and n are as set forth above, and X is the nitrogen-containing compound.

The LMWDPMA of any previous sentence wherein the nitrogen-containing compound comprises an aromatic amine. The LMWDPMA of any previous sentence wherein the nitrogen-containing compound comprises aniline. The LMWDPMA of any previous sentence wherein the nitrogen-containing compound comprises an N-alkylaniline. The LMWDPMA of any previous sentence wherein the nitrogen-containing compound comprises N-methyl aniline. The LMWDPMA of any previous sentence wherein the nitrogen-containing compound comprises N-butylaniline. The LMWDPMA of any previous sentence wherein the nitrogen-containing compound comprises di-(para-methylphenyl) amine. The LMWDPMA of any previous sentence wherein the nitrogen-containing compound comprises naphthylamine. The LMWDPMA of any previous sentence wherein the nitrogen-containing compound comprises 4-aminodiphenylamine. The LMWDPMA of any previous sentence wherein the nitrogen-containing compound comprises N,N-dimethylphenylenediamine. The LMWDPMA of any previous sentence wherein the nitrogen-containing compound comprises 4-(4-nitrophenylazo)aniline. The LMWDPMA of any previous sentence wherein the nitrogen-containing compound comprises sulfamethazine. The LMWDPMA of any previous sentence wherein the nitrogen-containing compound comprises 4-phenoxyaniline. The LMWDPMA of any previous sentence wherein the nitrogen-containing compound comprises 3-nitroaniline. The LMWDPMA of any previous sentence wherein the nitrogen-containing compound comprises 4-aminoacetanilide. The LMWDPMA of any previous sentence wherein the nitrogen-containing compound comprises 4-amino-2-hydroxy-benzoic acid phenyl ester. The LMWDPMA of any previous sentence wherein the nitrogen-containing compound comprises N-(4-amino-5-methoxy-2-methyl-phenyl)-benzamide. The LMWDPMA of any previous sentence wherein the nitrogen-containing compound comprises N-(4-amino-2,5-dimethoxy-phenyl)-benzamide. The LMWDPMA of any previous sentence wherein the nitrogen-containing compound comprises N-(4-amino-2,5-diethoxy-phenyl)-benzamide. The LMWDPMA of any previous sentence wherein the nitrogen-containing compound comprises N-(4-amino-phenyl)-benzamide. The LMWDPMA of any previous sentence wherein the nitrogen-containing compound comprises 4-phenylazoaniline. The LMWDPMA of any previous sentence wherein the nitrogen-containing compound comprises para-ethoxyaniline. The LMWDPMA of any previous sentence wherein the nitrogen-containing compound comprises para-dodecylaniline. The LMWDPMA of any previous sentence wherein the nitrogen-containing compound comprises cyclohexyl-substituted naphthylamine. The LMWDPMA of any previous sentence wherein the nitrogen-containing compound comprises thienyl-substituted aniline. The LMWDPMA of any previous sentence wherein the nitrogen-containing compound comprises an amino-substituted aromatic compound.

The LMWDPMA of any previous sentence wherein the nitrogen-containing compound comprises an amine in which an amine nitrogen is a part of an aromatic ring. The LMWDPMA of any previous sentence wherein the nitrogen-containing compound comprises 3-aminoquinoline. The LMWDPMA of any previous sentence wherein the nitrogen-containing compound comprises 5-aminoquinoline. The LMWDPMA of any previous sentence wherein the nitrogen-containing compound comprises 8-aminoquinoline. The LMWDPMA of any previous sentence wherein the nitrogen-containing compound comprises an aromatic amine. The LMWDPMA of any previous sentence wherein the nitrogen-containing compound comprises 2-aminobenzimidazole. The LMWDPMA of any previous sentence wherein the nitrogen-containing compound comprises N-(4-anilinophenyl)-3-aminobutanamide. The LMWDPMA of any previous sentence wherein the nitrogen-containing compound comprises aminocarbazoles. The LMWDPMA of any previous sentence wherein the nitrogen-containing compound comprises aminoindoles. The LMWDPMA of any previous sentence wherein the nitrogen-containing compound comprises aminopyrroles. The LMWDPMA of any previous sentence wherein the nitrogen-containing compound comprises amino-indazolinones. The LMWDPMA of any previous sentence wherein the nitrogen-containing compound comprises aminoperimidines. The LMWDPMA of any previous sentence wherein the nitrogen-containing compound comprises mercaptotriazoles. The LMWDPMA of any previous sentence wherein the nitrogen-containing compound comprises aminophenothiazines. The LMWDPMA of any previous sentence wherein the nitrogen-containing compound comprises aminopyridiens. The LMWDPMA of any previous sentence wherein the nitrogen-containing compound comprises aminopyrazines. The LMWDPMA of any previous sentence wherein the nitrogen-containing compound comprises aminopyrimidines. The LMWDPMA of any previous sentence wherein the nitrogen-containing compound comprises pyridines. The LMWDPMA of any previous sentence wherein the nitrogen-containing compound comprises pyrazines. The LMWDPMA of any previous sentence wherein the nitrogen-containing compound comprises pyrimidines. The LMWDPMA of any previous sentence wherein the nitrogen-containing compound comprises aminothiadiazoles. The LMWDPMA of any previous sentence wherein the nitrogen-containing compound comprises aminothiothiadiazoles. The LMWDPMA of any previous sentence wherein the nitrogen-containing compound comprises aminobenzotriaozles. The LMWDPMA of any previous sentence wherein the nitrogen-containing compound comprises 3-amino-N-(4-anilinophenyl)-N-isopropyl butanamide. The LMWDPMA of any previous sentence wherein the nitrogen-containing compound comprises N-(4-anilinophenyl)-3-{(3-aminopropyl)-(cocoalkyl)amino} butanamide. The LMWDPMA of any previous sentence wherein the nitrogen-containing compound comprises amines of the general structure $\phi$-CONH-$\phi$-NH$_2$, where the phenyl groups may be substituted.

The LMWDPMA of any previous sentence wherein the nitrogen-containing compound comprises a non-aromatic amine. The LMWDPMA of any previous sentence wherein the nitrogen-containing compound comprises monoamines having 1 to 8 carbon atoms. The LMWDPMA of any previous sentence wherein the nitrogen-containing compound comprises methylamine. The LMWDPMA of any previous sentence wherein the nitrogen-containing compound comprises ethylamine. The LMWDPMA of any previous sentence wherein the nitrogen-containing compound comprises propylamine. The LMWDPMA of any previous sentence wherein the nitrogen-containing compound comprises dimethylaminopropylamine. The LMWDPMA of any previous sentence wherein the nitrogen-containing compound comprises dimethylaminopropylamine. The LMWDPMA of any previous sentence wherein the nitrogen-containing compound comprises dibutyl aminopropyl amine. The LMWDPMA of any previous sentence wherein the nitrogen-containing compound comprises dimethylaminoethylamine. The LMWDPMA of any previous sentence wherein the nitrogen-containing compound comprises diethylaminoethylamine. The LMWDPMA of any previous sentence wherein the nitrogen-containing compound comprises dibutylaminoethylamine. The LMWDPMA of any previous sentence wherein the nitrogen-containing compound comprises 1-(2-aminoethyl)piperidine. The LMWDPMA of any previous sentence wherein the nitrogen-containing compound comprises 1-(2-aminoethyl)pyrrolidone. The LMWDPMA of any previous sentence wherein the nitrogen-containing compound comprises N,N-dim ethylethylamine. The LMWDPMA of any previous sentence wherein the nitrogen-containing compound comprises 3-(dimethylamino)-1-propylamine. The LMWDPMA of any previous sentence wherein the nitrogen-containing compound comprises O-(2-aminopropyl)-O'-(2-methoxyethyl)polypropylene glycol. The LMWDPMA of any previous sentence wherein the nitrogen-containing compound comprises N,N-dimethyldipropylenetriamine. The LMWDPMA of any previous sentence wherein the nitrogen-containing compound comprises aminoethylmorpholine. The LMWDPMA of any previous sentence wherein the nitrogen-containing compound comprises 3-morpholinopropylamine. The LMWDPMA of any previous sentence wherein the nitrogen-containing compound comprises aminoethylethyleneurea. The LMWDPMA of any previous sentence wherein the nitrogen-containing compound comprises aminopropylmorpholine.

The LMWDPMA of any previous sentence wherein the nitrogen-containing compound comprises mixtures of non-aromatic amines. The LMWDPMA of any previous sentence wherein the nitrogen-containing compound comprises mixtures of aromatic amines. The LMWDPMA of any previous sentence wherein the nitrogen-containing compound comprises non-aromatic amines in combination with aromatic amines. The LMWDPMA of any previous sentence wherein the nitrogen-containing compound comprises a minor amount of aromatic amine. The LMWDPMA of any previous sentence wherein the nitrogen-containing compound comprises is substantially free or free of aromatic amine.

A lubricant composition comprising an oil of lubricating viscosity and the LMWDPMA as claimed in any previous sentence.

The lubricating compositions of the previous paragraph comprising 0.1 wt % to 10 wt % of the LMWDPMA. The lubricating compositions of the previous paragraph comprising 0.25 wt % to 8 wt % of the LMWDPMA. The lubricating compositions of the previous paragraph comprising 0.5 wt % to 5 wt % of the LMWDPMA.

A method of lubricating an internal combustion engine comprising supplying to the internal combustion engine a lubricating composition comprising the lubricating composition of the previous paragraph. The use of the lubricating composition of the previous paragraph to improve fuel efficiency.

A process for preparing a low molecular weight dispersant polymethacrylate polymer ("LMWDPMA") as described in the paragraphs above, comprising 1) preparing the vinyl terminated polymethacrylate polymer by catalytic chain transfer polymerization; and 2) reacting the vinyl terminated polymethacrylate polymer with a nitrogen-containing group as set forth in the preceding paragraphs in the presence of microwave radiation. The process of the preceding sentence, where the vinyl terminated polymethacrylate polymer has a molecular weight of about 1000 to about 5000 Mn and a nitrogen-containing group.

What is claimed is:

1. A dispersant polymethacrylate polymer ("DPMA") comprising an amine terminated polymethacrylate polymer represented by Formula II

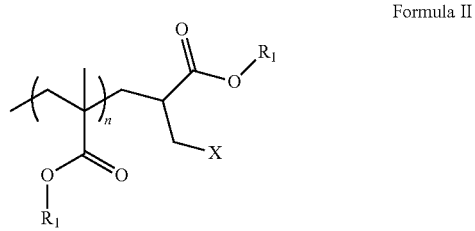

Formula II where $R_1$ is an alkyl group of 1 to 24 carbon atoms; X is a nitrogen-containing group; and n is an integer of 3 to 30.

2. The DPMA of claim 1 wherein the nitrogen-containing group comprises 3-morpholinopropylamine.

3. The DPMA of claim 1 wherein the nitrogen-containing group comprises 3-(dimethylamino)-1-propylamine.

4. A lubricant composition comprising an oil of lubricating viscosity and the DPMA as claimed in claim 1.

5. A method of lubricating an internal combustion engine comprising supplying to the internal combustion engine a lubricating composition comprising the lubricating composition of claim 4.

6. A process for preparing a dispersant polymethacrylate polymer comprising 1) preparing a vinyl terminated polymethacrylate polymer by catalytic chain transfer polymerization; 2) reacting the vinyl terminated polymethacrylate polymer with a nitrogen-containing group in the presence of microwave radiation.

7. The process of claim 6, where the vinyl terminated polymethacrylate polymer has a molecular weight of about 1000 to about 5000 Mn and is reacted with a nitrogen-containing group.

* * * * *